(12) United States Patent
Tsai et al.

(10) Patent No.: US 7,690,809 B2
(45) Date of Patent: Apr. 6, 2010

(54) LED LIGHTING DEVICE INLAID ON A CEILING

(75) Inventors: Tsung Cheng Tsai, Hukou Shiang (TW); Cheng Hung Peng, Hukou Shiang (TW)

(73) Assignee: Taiwan Green Energy Co., Ltd. (TW)

( * ) Notice: Subject to any disclaimer, the term of this patent is extended or adjusted under 35 U.S.C. 154(b) by 169 days.

(21) Appl. No.: 12/000,119

(22) Filed: Dec. 10, 2007

(65) Prior Publication Data

US 2009/0122528 A1      May 14, 2009

(30) Foreign Application Priority Data

Nov. 14, 2007    (TW) .............................. 96219222 U

(51) Int. Cl.
*F21V 33/00*    (2006.01)
(52) U.S. Cl. .................. 362/147; 362/150; 362/249.02; 362/249.11
(58) Field of Classification Search ................. 362/147, 362/150, 249.01, 249.02, 249.11, 404; 315/312
See application file for complete search history.

(56) References Cited

U.S. PATENT DOCUMENTS 6,764,196 B2 *  7/2004  Bailey ........................ 362/147

2005/0116667 A1 *  6/2005  Mueller et al. .............. 315/312

* cited by examiner

*Primary Examiner*—John A Ward
(74) *Attorney, Agent, or Firm*—Bacon & Thomas, PLLC

(57) ABSTRACT

The present invention provides an LED lighting device inlaid on a ceiling. The ceiling is divided into a plurality of lattice by a matrix of metal strip, plastic strip or wood strip, a matrix of LED are installed on the lattice; an AC power is inputted through a power line to an AC/DC converter for being converted into a DC power, and then the DC power passes through a current stabilizer, a resistor, a connector for being inputted to two ends of each row of the LEDs; LEDs of each row are serially connected.

Another embodiment of the present invention is to divide a ceiling into a plurality of lattice by a matrix of metal strip, plastic strip or wood strip, a plurality of vacated frame are formed on the lattice for being inlaid with a plurality of LED module respectively; a connector and a matrix of LED are installed on the LED module; a plate is installed on the upper edge and lower edge of the vacated frame; a power line, an AC/DC converter, a current stabilizer and a resistor are installed on the plate; an AC power is inputted through the power line to the AC/DC converter for being converted into a DC power, and then the DC power passes through the current stabilizer, the resistor, the connector for being inputted to two ends of each row of the LEDs; LEDs of each row are serially connected.

5 Claims, 8 Drawing Sheets

LED LIGHTING DEVICE INLAID ON A CEILING

FIELD OF THE INVENTION

The present invention relates to an LED lighting device, and more particularly to an LED lighting device inlaid on a ceiling.

BACKGROUND OF THE INVENTION

Conventional lighting devices such as incandescent lamp, fluorescent lamp not only consume too much electricity by the lighting devices but also raise the surrounding temperature due to high heat dissipation that indirectly increase air condition load, and therefore cause global warming to harm the environmental protection.

For example, referring to FIG. 1, which shows a ceiling 1 of an office. The ceiling 1 is divided into a plurality of lattice 12 by a matrix of metal strip 11, some lattices 12 are installed with fluorescent lamp 13 for lighting. The fluorescent lamp 13 consumes too much electricity and dissipates too much heat, therefore it cause the disadvantages of the fluorescent lamp 13. However, LED consumes much less electricity and dissipates much less heat, so LED lighting devices become more popular and practical.

Facing the global warming problem, it is therefore an object of the present invention to save electricity consumption of the lighting devices and lower the heat dissipation in office.

SUMMARY OF THE INVENTION

The object of the present invention is to provide an LED lighting device inlaid on a ceiling. The ceiling is divided into a plurality of lattice by a matrix of metal strip, plastic strip or wood strip, a matrix of LED are installed on the lattice; an AC power is inputted through a power line to an AC/DC converter for being converted into a DC power, and then the DC power passes through a current stabilizer, a resistor, a connector for being inputted to two ends of each row of the LEDs; LEDs of each row are serially connected.

Another embodiment of the present invention is to divide a ceiling into a plurality of lattice by a matrix of metal strip, plastic strip or wood strip; a plurality of vacated frame are formed on the lattice for being inlaid with a plurality of LED module respectively; a connector and a matrix of LED are installed on the LED module; a screw hole is formed on the upper edge and on the lower edge of the LED module; a plate is installed on the upper edge and the lower edge of the vacated frame, a screw hole on the plate is exposed along the edge of the vacated frame; a power line, an AC/DC converter, a current stabilizer and a resistor are installed on the plate; the screw hole on the plate corresponds to the screw hole on the LED module, when the LED module is inlaid within the vacated frame, a screw is used to pass through the two screw holes to fix the LED module and the plate; an AC power is inputted through a power line to the AC/DC converter for being converted into a DC power, and then the DC power passes through the current stabilizer, the resistor, the connector for being inputted to two ends of each row of the LEDs; LEDs of each row are serially connected.

DETAILED DESCRIPTION OF THE PREFERRED EMBODIMENTS

Figure 1:
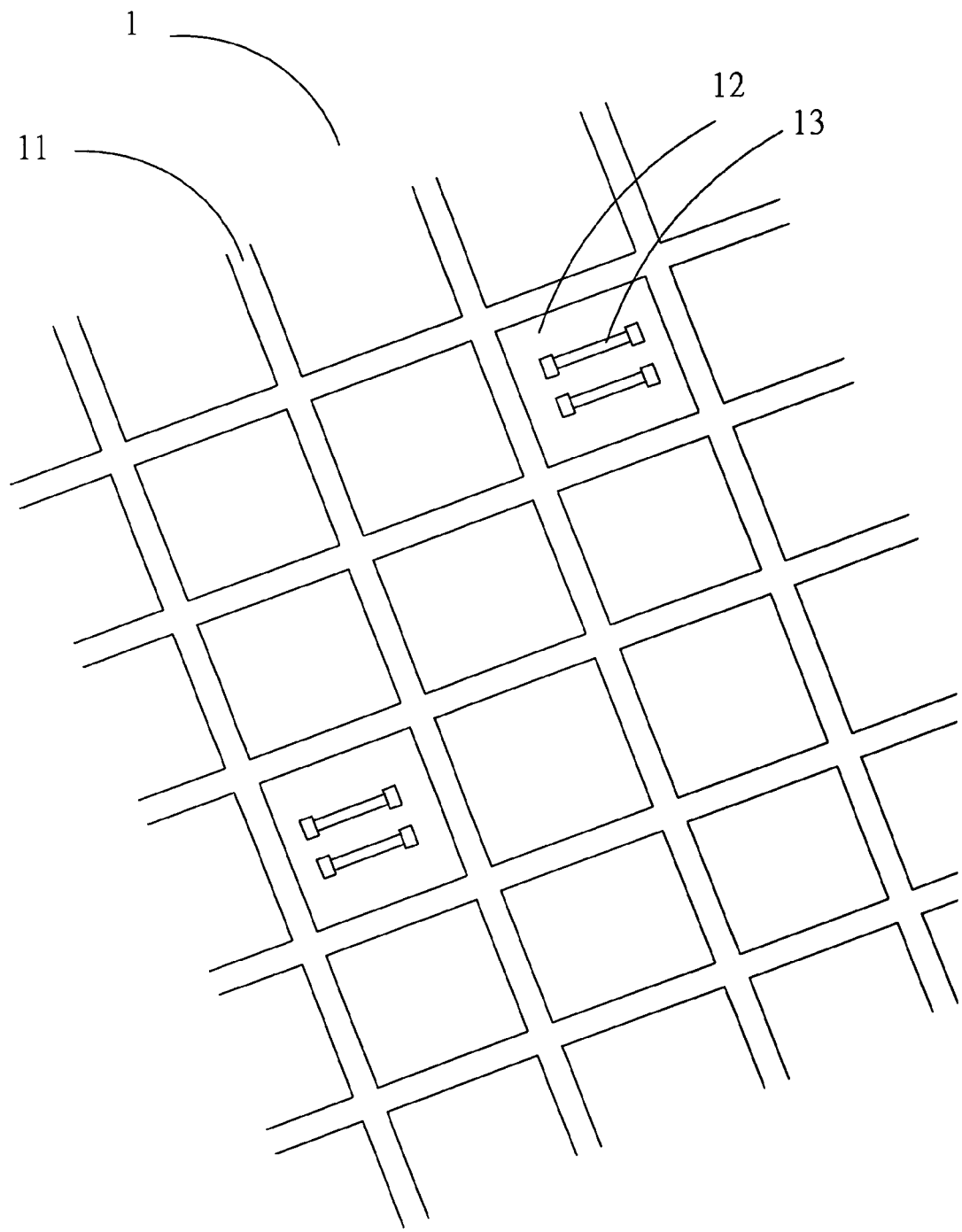
FIG. 1 shows schematically a ceiling of a conventional office.
Figure 2:
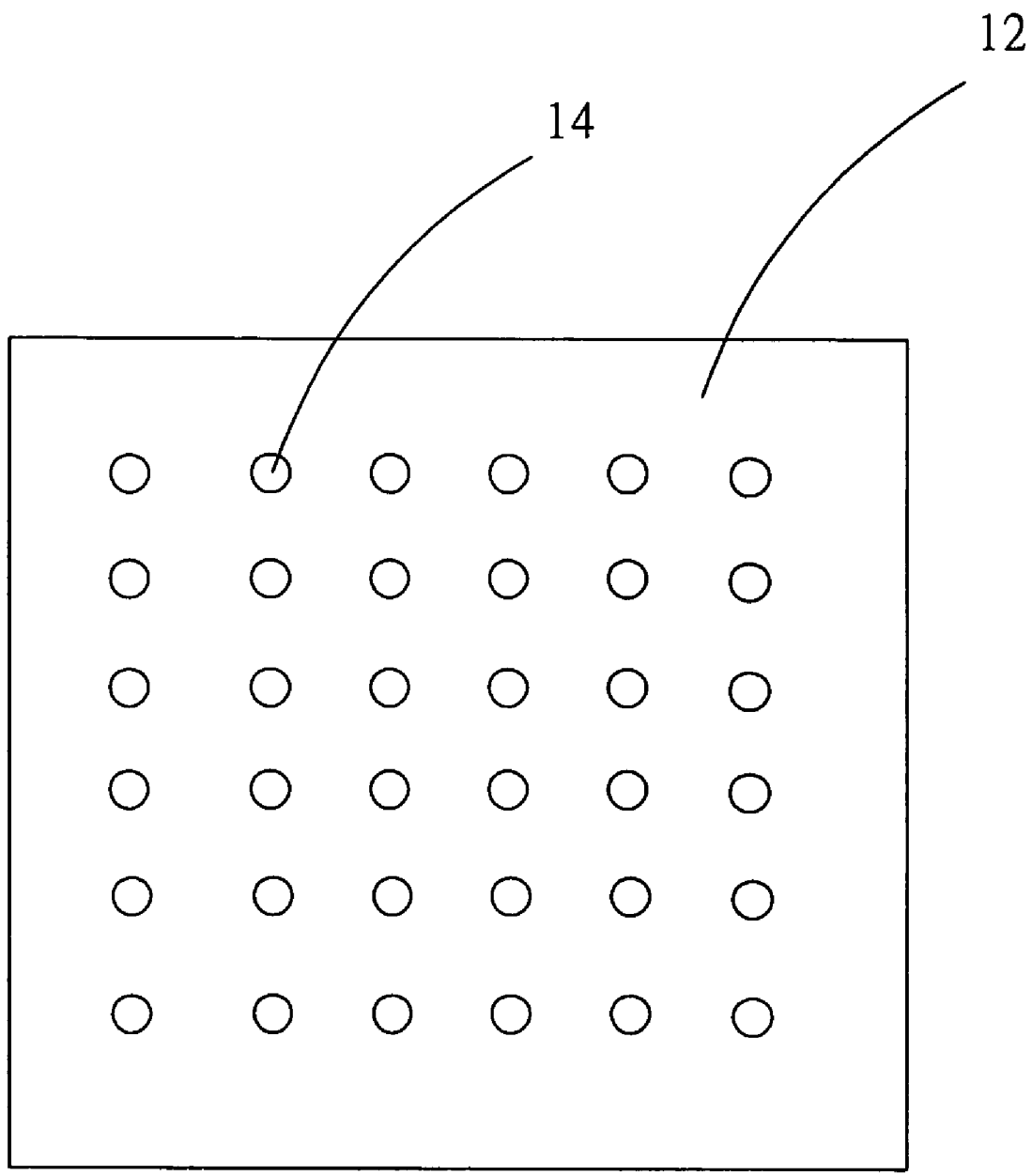
FIG. 2 shows schematically an LED lighting device inlaid on a ceiling according to the present invention.
Figure 3:
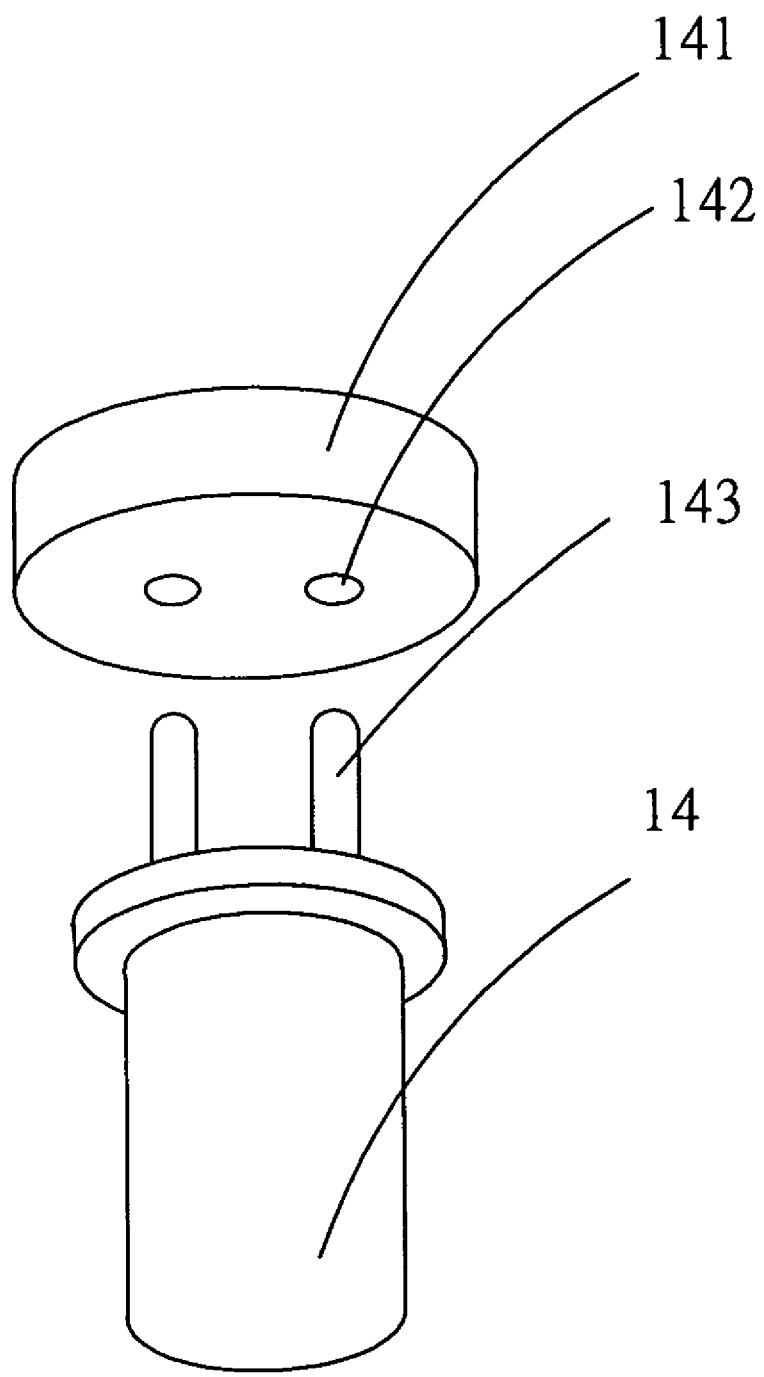
FIG. 3 shows schematically that a socket is installed on the ceiling for being inserted by an LED.

Referring to FIG. 2, which shows schematically an LED lighting device inlaid on a ceiling according to the present invention. A square lattice 12 of the ceiling is not installed with fluorescent lamp 13, but installed with a matrix of LED 14. A plurality of hole are formed on the lattice 12 according to pins of the LED 14 for being inserted with the LED 14; or as shown in FIG. 3, sockets 141 are installed on the lattice 12, holes 142 are formed on the socket 141 for being inserted with pins 143 of the LED 14.

Figure 4:
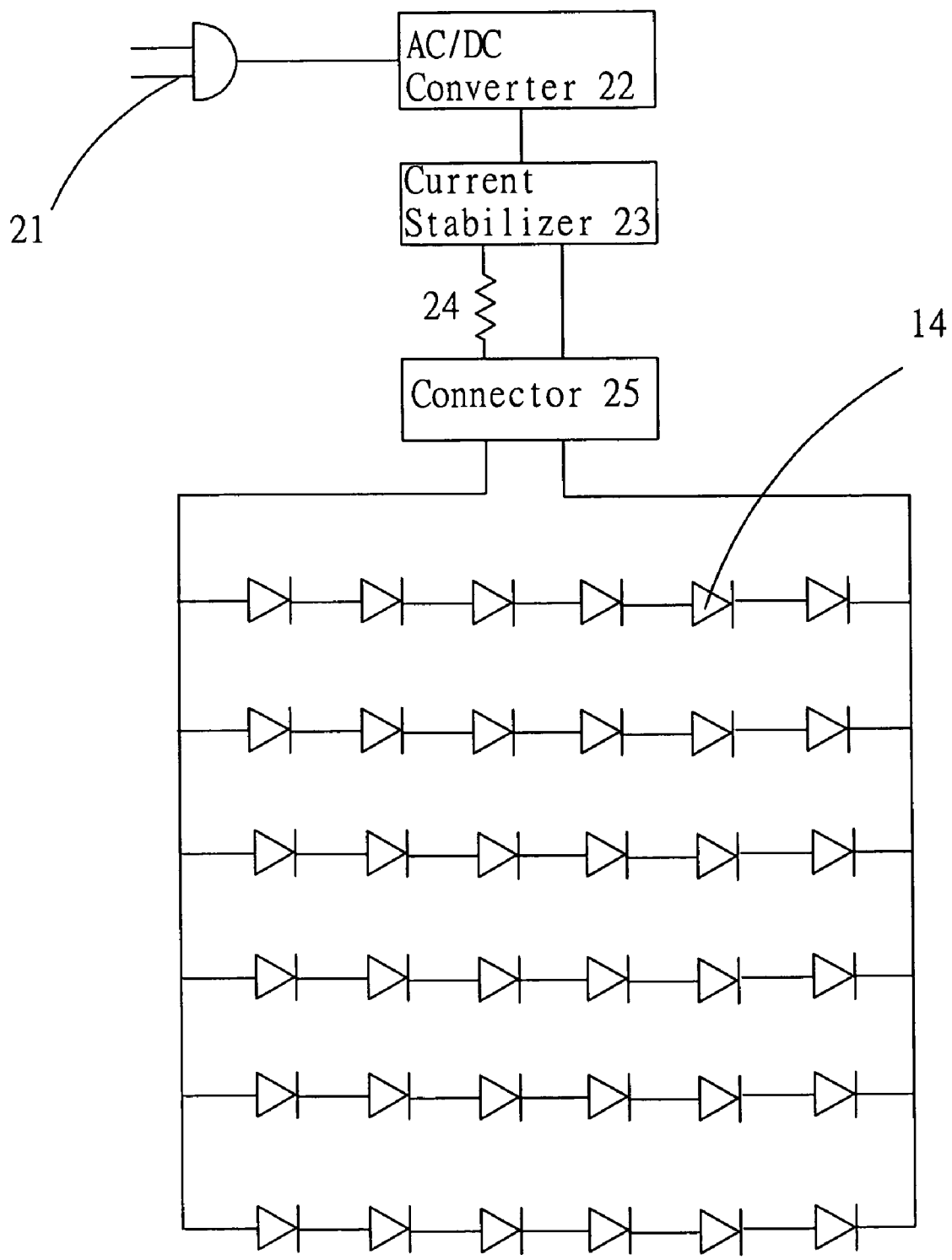
FIG. 4 shows the circuit diagram for LED lighting device inlaid on the ceiling according to the present invention.

FIG. 4 shows the circuit diagram for LED lighting device inlaid on a ceiling according to the present invention. An AC power is inputted through a power line 21 to an AC/DC converter 22 for being converted into a DC power, and then pass through a current stabilizer 23, a resistor 24, a connector 25 for being inputted to two ends of each row of the LEDs, LEDs of each row are serially connected. The power line 21, the AC/DC converter 22, the current stabilizer 23, the resistor 24 and the connector 25 are disposed on top of the lattice 12, and the lattice 12 is disposed on the square frame formed by the matrix of metal strip 11. The power line 21 and the AC/DC converter 22 can be replaced by a battery or a DC/DC converter for providing DC power.

Figure 5:
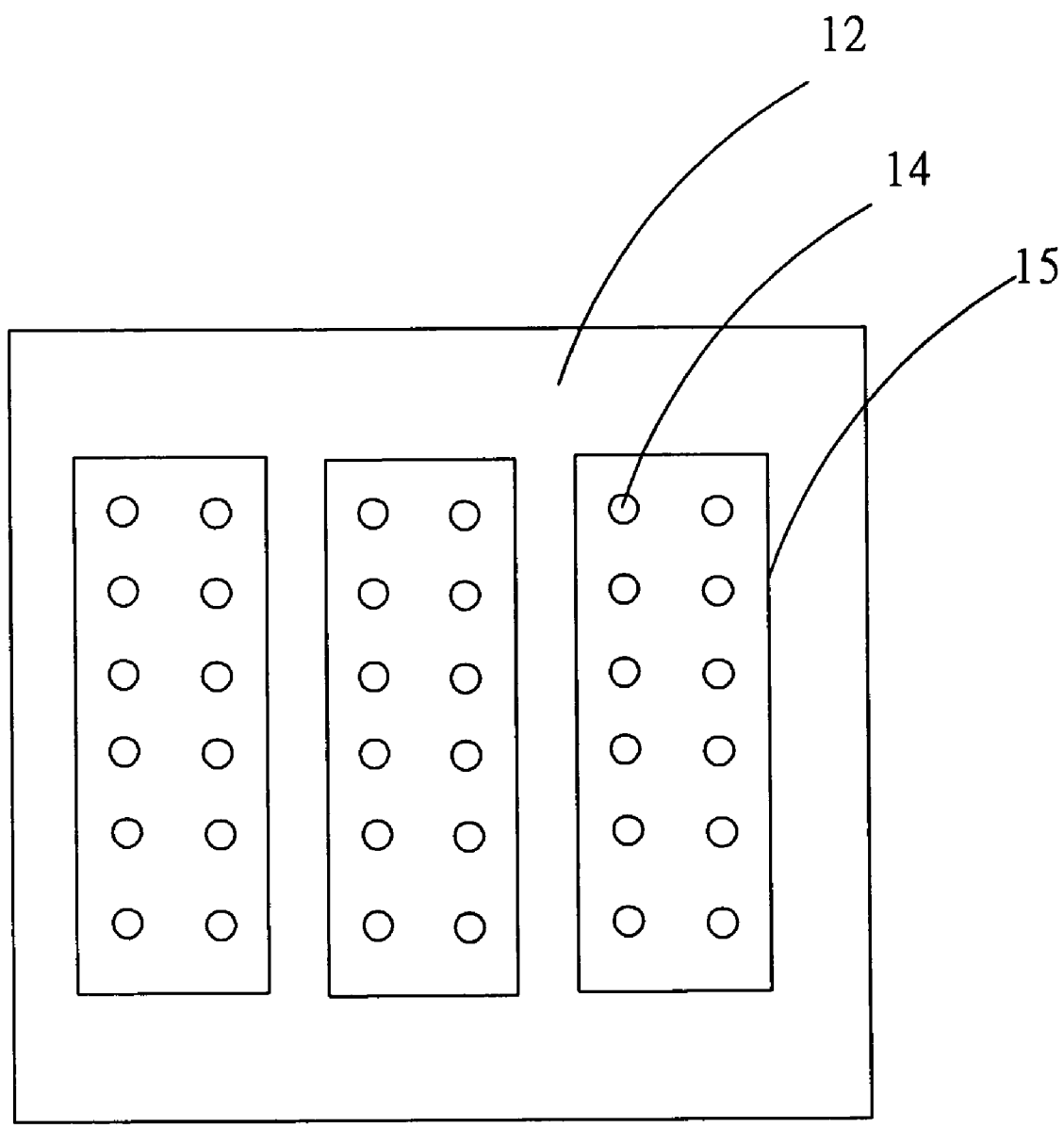
FIG. 5 shows schematically a second embodiment according to the present invention.
Figure 6:
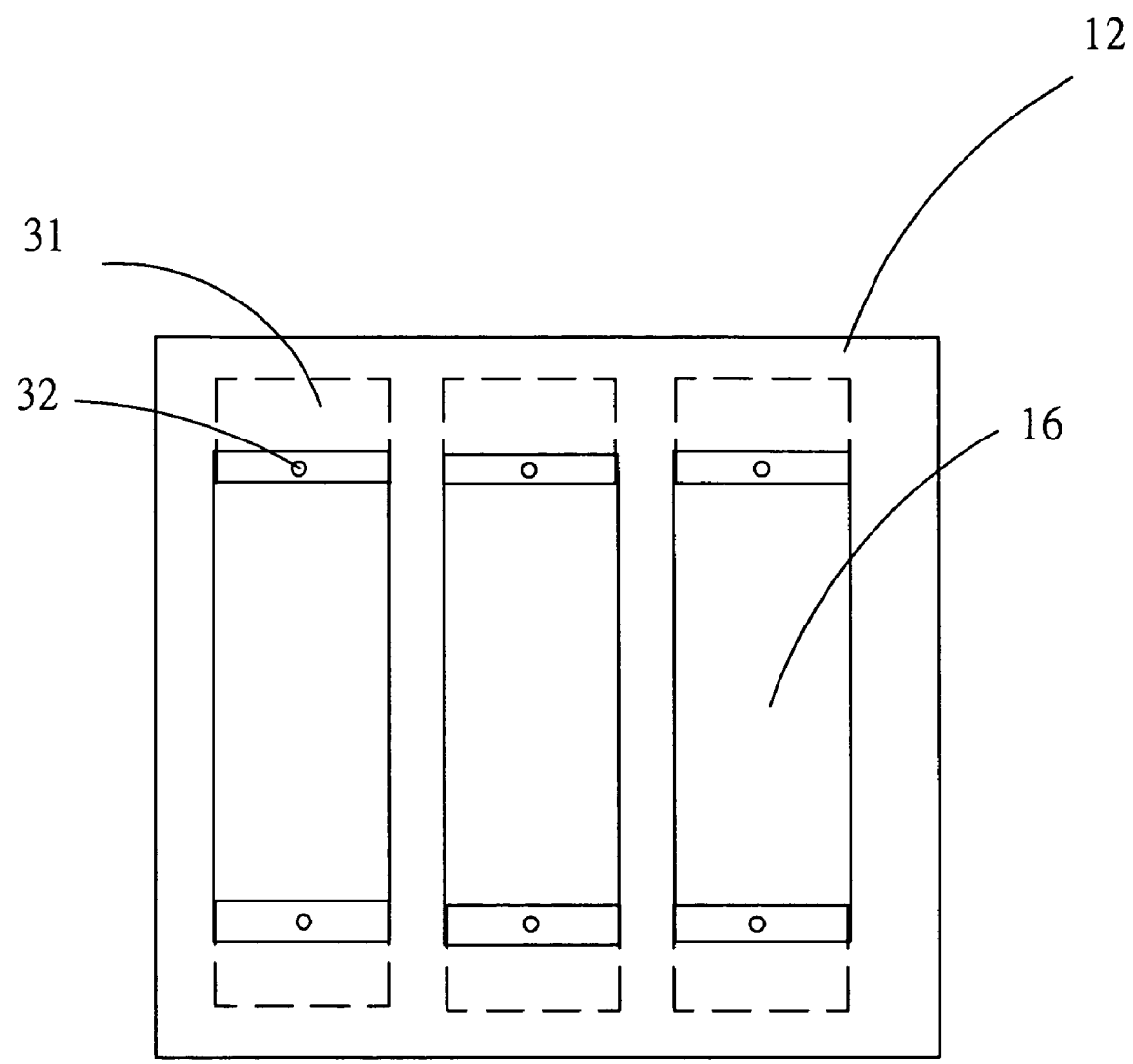
FIG. 6 shows three vacated frames are formed on the lattice of the ceiling.

FIG. 5 shows schematically a second embodiment according to the present invention. Three vacated frames 16 (please see FIG. 6) are formed on the lattice 12 for being inlaid with LED modules 15 respectively. FIG. 6 shows six plates 31 are disposed along the upper and the lower edges of the vacated frames 16 and on top of the lattice 12. Each of the six plates 31 has a screw hole 32 for being exposed along the edge of the vacated frame 16.

Figure 7:
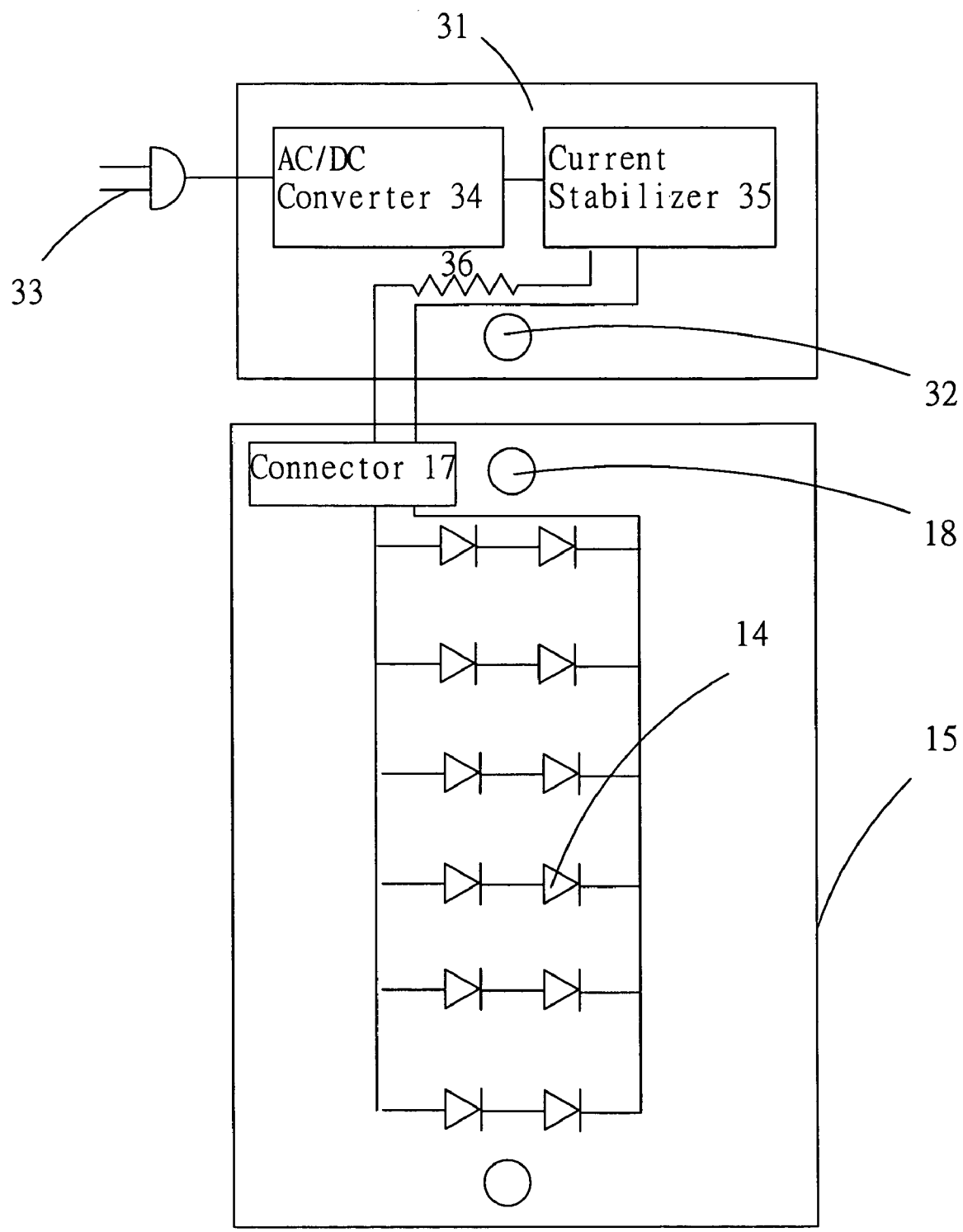
FIG. 7 shows the circuit diagram for LED lighting device inlaid on the ceiling according to the second embodiment of the present invention.

Referring to FIG. 7, which shows the circuit diagram for LED lighting device inlaid on the ceiling according to the second embodiment of the present invention. The plate 31 has a power line 33, an AC/DC converter 34, a current stabilizer 35 and a resistor 36, while the LED Module 15 is disposed with a connector 17 and a matrix of LED 14. A screw hole 32 on the plate 31 corresponds to a screw hole 18 on the LED Module 15, when the LED module 15 is inlaid within the vacated frame 16, a screw is used for passing through the two screw holes 18, 32 for fixing the plate 31 and the LED Module 15.

An AC power is inputted through the power line 33 to the AC/DC converter 34 for being converted into a DC power, and then pass through the current stabilizer 35, the resistor 36, the connector 17 for being inputted to two ends of each row of the LEDs, LEDs of each row are serially connected. The power line 33 and the AC/DC converter 34 can be replaced by a battery or a DC/DC converter for providing DC power.

Figure 8:
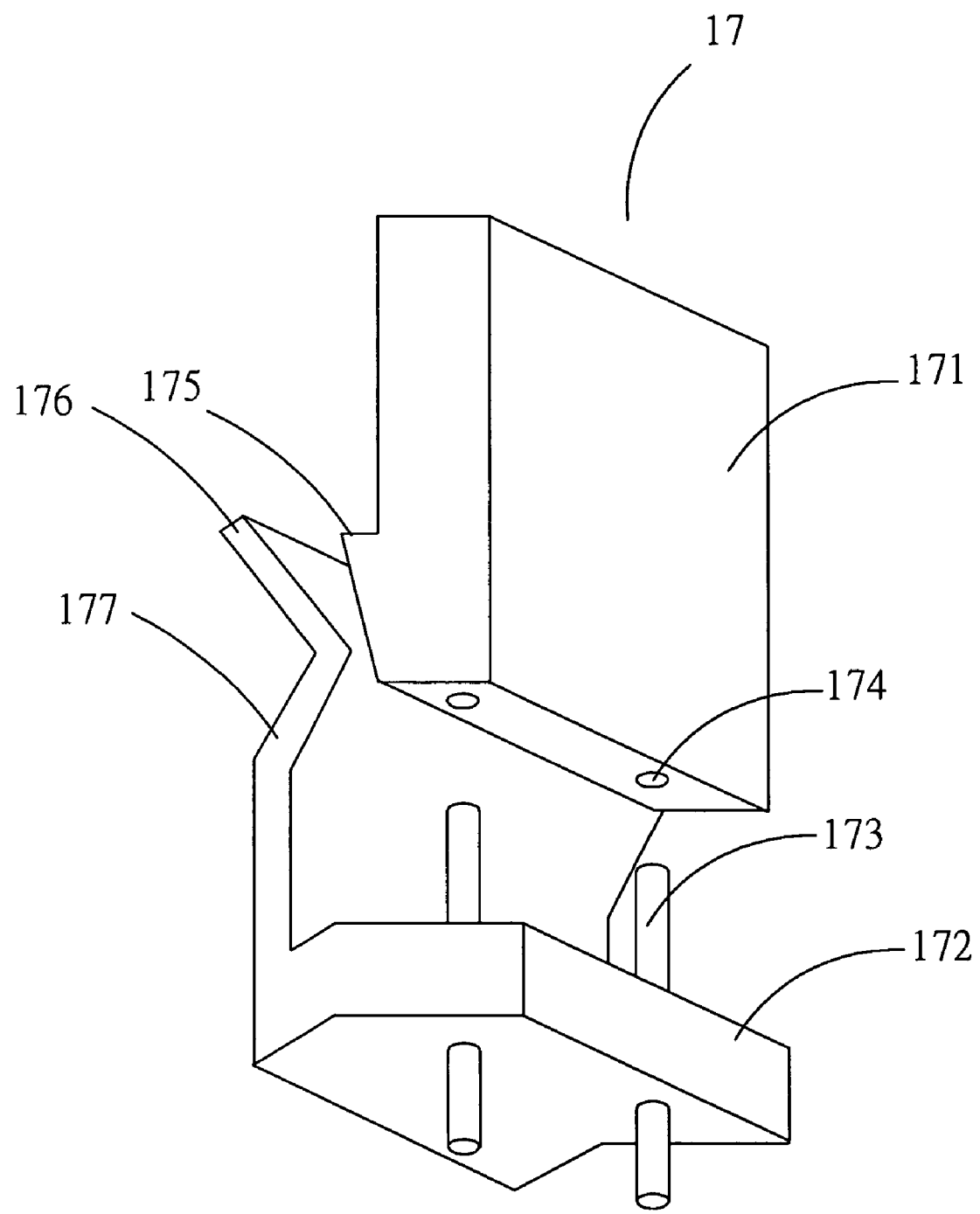
FIG. 8 shows schematically the structure of the connector according to the second embodiment of the present invention.

FIG. 8 shows the structure of the connector 17. A male pedestal 172 is installed on the LED module 15, while a female socket 171 is installed on the plate 31. The lower part of two pins 173 of the male pedeatal 172 are connected with two ends of each row of the LEDs respectively, while the upper part of two pins 173 are inserted into the two holes 174 of the female socket 171. When the two pins 173 of the male pedeatal 172 are pushed into the two holes 174 of the female socket 171, a left arm 177 of the male pedestal 172 will be hooked up on a stand 175 of the female socket 171, therefore the male pedestal 172 stays on the female socket 171. If a plate 176 of the male pedestal 172 is pulled to cause the arm 177 leave the stand 175, then the male pedestal 172 can depart from the female socket 171. The connector 17 can replace the screw holes 18, 32 to act as a fixing mechanism between the LED module 15 and the plate 31.

The ceiling 1 is made of wood, plastic, asbestos or calcium silicate. The metal strip 11 for dividing the ceiling 1 can be replaced by wood strip or plastic strip.

The scope of the present invention depends upon the following claims, and is not limited by the above embodiments.

What is claimed is:

1. An LED lighting device inlaid on a ceiling, wherein the ceiling is divided into a plurality of lattices, and a plurality of vacated frames are formed on the lattices for being inlaid with a plurality of LED modules respectively;
    a connector and a matrix of LEDs are installed on the LED modules, wherein the matrix of LEDs comprises at least one row of LEDs and the LEDs of each row are serially connected;
    a screw hole is formed on upper edge and lower edge of the LED modules respectively;
    a plate is installed on upper edge and lower edge of the vacated frames respectively, and a screw hole on the plate is exposed along the edge of the vacated frames;
    a power line, an AC/DC converter, a current stabilizer and a resistor are installed on the plate;
    the screw hole on the plate corresponds to the screw hole on the LED module, such that when the LED module is inlaid within the vacated frame, a screw is used to pass through the two screw holes to fix the LED module and the plate;
    an AC power is inputted through the power line to the AC/DC converter for being converted into a DC power, and then the DC power passes through the current stabilizer, the resistor, and the connector for being inputted to two ends of each row of the LEDs.

2. The LED lighting device inlaid on a ceiling according to claim 1, wherein a battery or a DC/DC converter can be used to replace the power line and the AC/DC converter for providing the DC power.

3. The LED lighting device inlaid on a ceiling according to claim 1, wherein sockets are installed on the LED module, holes are formed on the socket for being inserted with pins of the LED.

4. The LED lighting device inlaid on a ceiling according to claim 1, wherein:
    the connector comprises a male pedestal and a female socket; the male pedestal is installed on the LED module, the female socket is installed on the plate;
    a lower part of pins of the male pedestal are connected with two ends of each row of the LEDs respectively, while an upper part of pins of the male pedestal are inserted into two holes of the female socket;
    wherein when pins of the male pedestal are pushed into two holes of the female socket, a left arm of the male pedestal will be hooked up on a stand of the female socket, therefore the male pedestal stays on the female socket; and
    wherein if a plate of the male pedestal is pulled to cause the left arm to leave the pedestal, then the male pedestal can depart from the female socket.

5. The LED lighting device inlaid on a ceiling according to claim 4, wherein the connector can replace the screw holes to act as a fixing mechanism between the LED module and the plate.

* * * * *